United States Patent
Doshita

(10) Patent No.: US 6,417,452 B1
(45) Date of Patent: Jul. 9, 2002

(54) WIRING HARNESS BENDING MECHANISM

(75) Inventor: Kenichi Doshita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/686,951

(22) Filed: Oct. 12, 2000

(30) Foreign Application Priority Data

Oct. 13, 1999 (JP) .......................................... 11-290776

(51) Int. Cl.⁷ ............................................... H02G 3/00

(52) U.S. Cl. .................. 174/72 A; 174/68.3; 174/70 R; 174/99 R; 174/70 C; 174/68.1; 174/135; 361/826

(58) Field of Search ............................ 174/72 A, 135, 174/68.3, 70 R, 99 R, 70 C, 68.1; 16/229, 224, 268, 231, 230; 361/826

(56) References Cited

U.S. PATENT DOCUMENTS

| | | | | |
|---|---|---|---|---|
| 1,822,624 A | * | 9/1931 | Hoeftmann | 285/154.3 |
| 5,197,767 A | * | 3/1993 | Kimura et al. | 285/39 |
| 5,556,059 A | * | 9/1996 | Maeda et al. | 248/49 |
| 5,904,002 A | * | 5/1999 | Emerling et al. | 49/502 |
| 6,142,580 A | * | 11/2000 | Sinn et al. | 303/20 |

OTHER PUBLICATIONS

Japanese U.M. Reg. Appln. laid–open No. 63–113416, Jul. 21, 1988.
Japanese U.M. Reg. Appln. laid–open No. 61–202118, Dec. 18, 1986.

* cited by examiner

Primary Examiner—Dean A. Reichard
Assistant Examiner—Jinhee J Lee
(74) Attorney, Agent, or Firm—Armstrong, Westerman & Hattori, LLP

(57) ABSTRACT

A wiring harness bending mechanism is provided, which includes: a wiring harness; and first and second link arms each having a tubular portion to put the wiring harness therethrough, wherein a pair of convexities are formed on the first link arm and a pair of concavities to engage the convexities are formed on the second link arm. The first link arm is formed of a pair of first divided link arms connected with a hinge portion and each having a convexity, and the second link arm is formed of a pair of second divided link arms connected with a hinge portion and each having a concavity. A plate portion is provided projectingly from each of the tubular portions, and the pair of convexities are arranged on one end side of one plate portion and the pair of concavities are arranged on one end side of the other plate portion. A fixing portion is provided on each of the other end sides of the respective plate portions for mounting the first and second link arms. The wiring harness is bendably exposed between the tubular portions. The first link arm is pivotably supported by a guide rail and the second link arm slidably engages the guide rail.

7 Claims, 7 Drawing Sheets

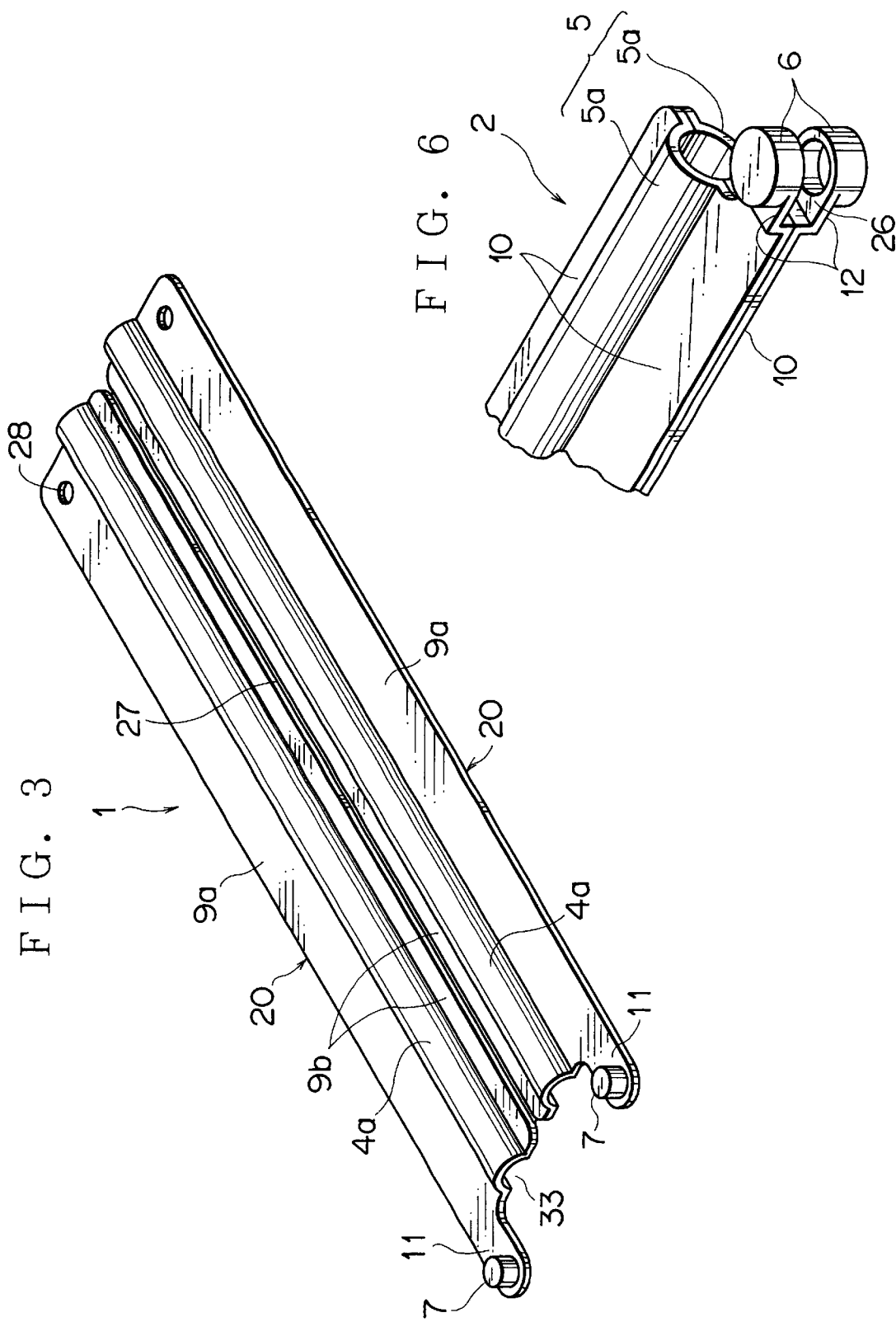

WIRING HARNESS BENDING MECHANISM

BACKGROUND OF THE INVENTION

1. Field of the Invention

The present invention relates generally to a wiring harness arranging structure to be applied to a sliding door of a motor vehicle or the like, and more particularly to a wiring harness bending mechanism wherein a pair of link arms equipped with a wiring harness are capable of bending integrally with the wiring harness along with an opening and closing operation of the sliding door so that the door is allowed to open and close.

2. Description of the Related Art

FIG.9 shows bending structure of a wiring harness protector disclosed in Japanese Utility Model Registration Application Laid-open No.63-113416 as a first prior art. This wiring harness protector 60 is formed of a protector body 61 and a cover 62 both made of synthetic resin and is bendable with a thin hinge portion 63 arranged in its middle portion. The cover 62 engages the protector body 61 by means of an engaging projection 64 and an engagement frame 65.

A wiring harness 66 is put in the protector body 61 and the cover 62 is put thereon so that the wiring harness 66 is protected from the outside. The protector body 61 is capable of bending integrally with the wiring harness 66 along bent portions of a vehicle body. The wiring harness 66 consists of electric wires and is fixed to the end of the wiring harness protector 60 with a vinyl tape 67.

FIG. 10 shows bending structure of a wiring harness protector disclosed in Japanese Utility Model Registration Application Laid-open No.61-202118 as a second prior art. This wiring harness protector 70 of synthetic resin is formed in a semicylindrical shape and is bendable with a bellows portion 71 arranged in its middle portion. Engagement portions 72 are protrusively-provided on both ends of the bellows portion 71 so that the wiring harness protector 70 can be fixedly bent about the bellows portion 71.

With respect to the first and second prior arts, however, when the wiring harness protector 60 or 70 is bent at the hinge portion 63 or the bellows portion 71 repeatedly, especially under a cold condition, the hinge portion 63 or the bellows portion 71 is deformed or damaged.

Therefore, the wiring harness could be exposed with poor protection. Furthermore, arrangement work of the above structures is troublesome and the parts cost is high.

SUMMARY OF THE INVENTION

In view of the foregoing, an object of the present invention is to provide a wiring harness bending mechanism wherein a wiring harness can be easily secured to a pair of link arms, the wiring harness can be securely protected, and the pair of link arms with smaller number of parts can be easily assembled in low cost.

In order to achieve the above object, as a first aspect of the present invention, a wiring harness bending mechanism comprises: a wiring harness; and first and second link arms each having a tubular portion to put the wiring harness therethrough, wherein a pair of convexities are formed on the first link arm and a pair of concavities to engage the convexities are formed on the second link arm.

As a second aspect of the present invention, in the structure with the above first aspect, the first link arm is formed of a pair of first divided link arms connected with a hinge portion and each having a convexity, and the second link arm is formed of a pair of second divided link arms connected with a hinge portion and each having a concavity.

As a third aspect of the present invention, in the structure with the above first aspect, a plate portion is provided projectingly from each of the tubular portions, and the pair of convexities are arranged on one end side of one plate portion and the pair of concavities are arranged on one end side of the other plate portion.

As a fourth aspect of the present invention, in the structure with the above third aspect, a fixing portion is provided on each of the other end sides of the respective plate portions for mounting the first and second link arms.

As a fifth aspect of the present invention, in the structure with the above third aspect, the wiring harness is bendably exposed between the tubular portions.

As a sixth aspect of the present invention, in the structure with the above first aspect, the first link arm is pivotably supported by a guide rail and the second link arm slidably engages the guide rail.

As a seventh aspect of the present invention, in the structure with the above first aspect, three or more link arms are provided instead of the first and second link arms and an intermediate link arm has the pair of convexities or the pair of concavities at each end side thereof.

According to the above-described structure of the present invention, the following advantages are provided.

(1) Since the convexity and the concavity integrally provided on the link arms engage each other, the link arms can be easily assembled with lower cost without using another connection means requiring other members. And, since the wiring harness can be protected by the tubular portions, the wiring harness does not wear off and is not damaged.

(2) Since each pair of divided link arms is connected with each hinge, assembly work of the link arms can be easily and effectively executed, thereby improving productivity and reducing manufacturing costs.

(3) Since the convexities and the concavities are connected at a position (i.e. the link portion) apart from center lines of the tubular portions, the link portion does not obstruct the wiring harness, thereby enabling the wiring harness to bend smoothly. And, the plate portion increases the bending rigidity of the link arm, which enables the link arms to be of synthetic resin.

(4) Since the plate portion can be fixed, for example, to a guide rail provided on a sliding door or to a slide block sliding along the guide rail, the wiring harness does not interfere with the fixing portions of the link arms, thereby ensuring smoother movement of the link arms and the wiring harness.

(5) Since the wiring harness can be bent with a small force without interfering with a link portion of the link arms, the link arms can bend smoothly and damaging of the wiring harness can be prevented.

(6) The link arms can absorb an opening/closing stroke of the sliding door when the guide rail is set to a sliding door, for example, of a motor vehicle, which enables continuous power feeding to the sliding door through the wiring harness.

The above and other objects and features of the present invention will become more apparent from the following description taken in conjunction with the accompanying drawings.

BRIEF DESCRIPTION OF THE DRAWINGS

FIG. 3 is a perspective view showing one of the link arms in an opened state of divided link arms;

FIG. 6 is a perspective view showing a key portion of the link arm of FIG. 4 in a closed state of the divided link arms;

DESCRIPTION OF THE PREFERRED EMBODIMENT(S)

An embodiment of the present invention will be now described in further detail with reference to the accompanying drawings.

Figure 1:
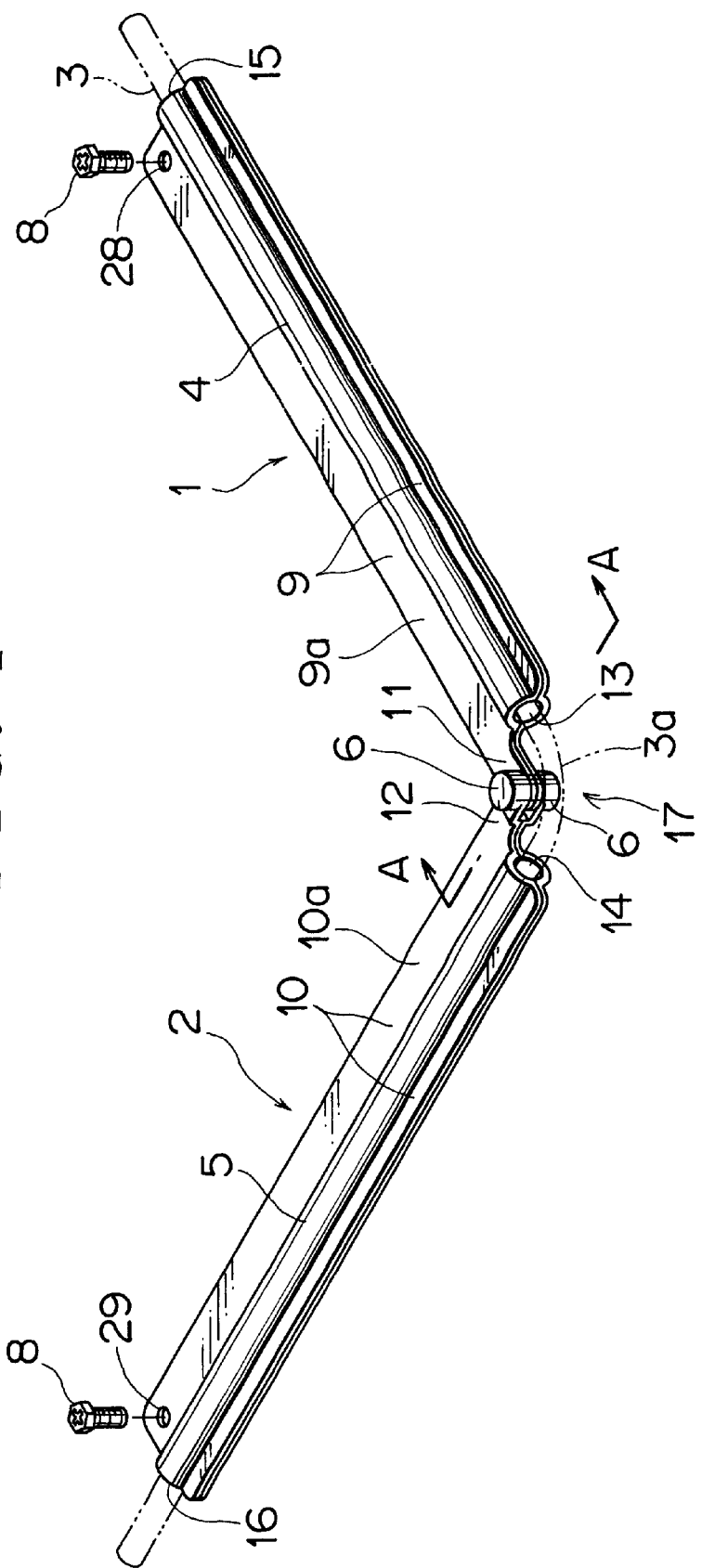
FIG. 1 is a perspective view showing an embodiment of a wiring harness bending mechanism in accordance with the present invention.

As shown in FIG. 1, the wiring harness bending mechanism of the present invention has a pair of link arms 1,2 made of synthetic resin. The link arms 1,2 integrally have respective tubular portions 4,5 to put a wiring harness 3 therethrough. The wiring harness 3 consists of single or plural electric wires. One end sides of respective link arms 1,2 pivotably engage each other by means of a pair of concavities 6 and a pair of convexities 7 (FIG. 2), and the other end side of each of the link arms 1,2 is secured with bolt 8.

Bodies of the link arms 1,2 consist of flat plate portions (plate portions) 9,10 and tubular portions 4,5, respectively. The above one end sides (i.e. link portion 17 sides) of wide flat plate portions 9a,10a of the respective link arms 1,2 extend to form respective extending portions 11,12, and the concavities 6 and the convexities 7 (FIG. 2) are integrally formed at the respective ends of the extending portions 11,12.

The link arms 1,2 have openings 13,14 and the other openings 15,16 on both sides of the tubular portions 4,5, respectively. The tubular portions 4,5, extends straight in parallel with the respective flat plate portions 9,10. A wiring harness 3a (i.e. an exposed portion of the wiring harness 3) is exposed between the openings 13,14 and is curved around the link portion 17 (i.e. an engaging portion of the concavities 6 and the convexities 7).

The exposed portion 3a of the wiring harness 3 is arranged outside the link portion 17 with some margin in a state of link arms 1,2 being in parallel with each other for preventing an interference therebetween. There may preferably be some gap between an outside diameter of the wiring harness 3 and an inside diameters of the tubular portions 4,5 for permitting the wiring harness 3 to smoothly shift in the tubular portions 4,5 longitudinally so as to prevent excessive tension in the wiring harness 3.

Figure 2:
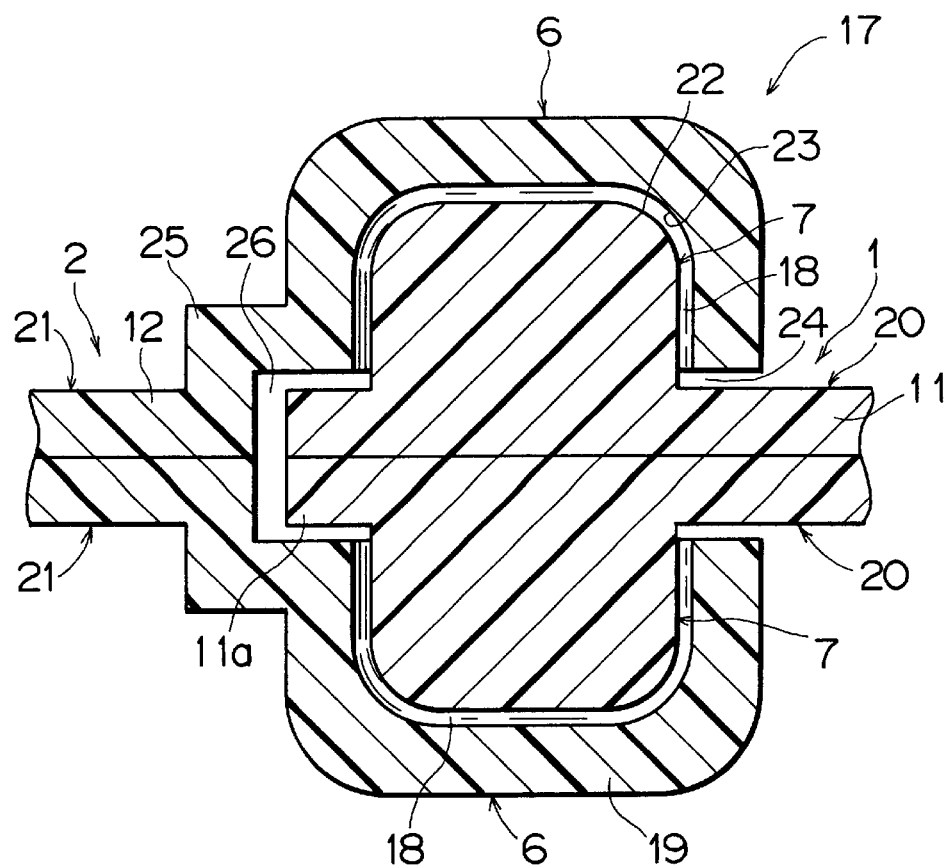
FIG. 2 is a sectional view, taken along a line A—A in FIG. 1, showing a link portion of the link arms.

Referring to FIG. 2, the convexity 7 engages the concavity 6 with a little gap 18. The gap 18 is preferably small from a viewpoint of preventing a ricketiness, while permitting the link arms 1,2 to turn with respect to each other. The convexity 7 is formed in a short column, and the concavity 6 is formed in a short cylinder with a bottom portion 19.

A pair of convexities 7 and a pair of concavities 6 are provided vertically symmetrically. The link arms 1,2 consist of respective pairs of divided link arms 20,21 (FIG. 3). The pair of divided link arms are piled up. The convexity 7 has a curved portion 22 at the end and the concavity 6 has a curved portion 23 corresponding to the curved portion 22 at the bottom portion 19 so as to permit three-dimensional movement of a pair of link arms 1,2.

The extending portion 11 of the link arm 1 having the convexities 7 is arranged inside a space 24 of a pair of concavities 6. The concavity 6 continues to the extending portion 12 of the link arm 2 through a step portion 25. Front end portions 11a of the extending portions 11 of the link arms 1 are disposed in a space 26 between the step portions 25. The convexities 7 are capable of three-dimensional movement within the gap 18 so that the link portion 17 does not bring about an excessive stress due to bending, tension, or compression.

Referring to FIG. 3, the link arm 1 consists of a pair of symmetrically divided link arms 20, a thin hinge portion 27 turnably connecting the divided link arms 20, and the convexities 7 formed on the extending portions 11 of the respective divided link arms 20.

Each divided link arm 20 consists of a semicylindrical portion 4a, a wide flat plate portion 9a extending from one edge of the semicylindrical portion 4a, a narrow flat plate portion 9b extending from the other edge of the semicylindrical portion 4a, and the extending portion 11 projecting from one side of the wide flat plate portion 9a.

The semicylindrical portion 4a, of course, has a semicircular groove 33 in the inside. One side of the flat plate portion 9b continues to the hinge portion 27. Through hole (i.e. fixing portions) 28 to mount the link arm 1 to a vehicle door with a bolt 8 (FIG. 1) is provided on the other end of each flat plate portion 9a. The convexities 7 project in the same direction as the semicylindrical portions 4a.

Figure 4:
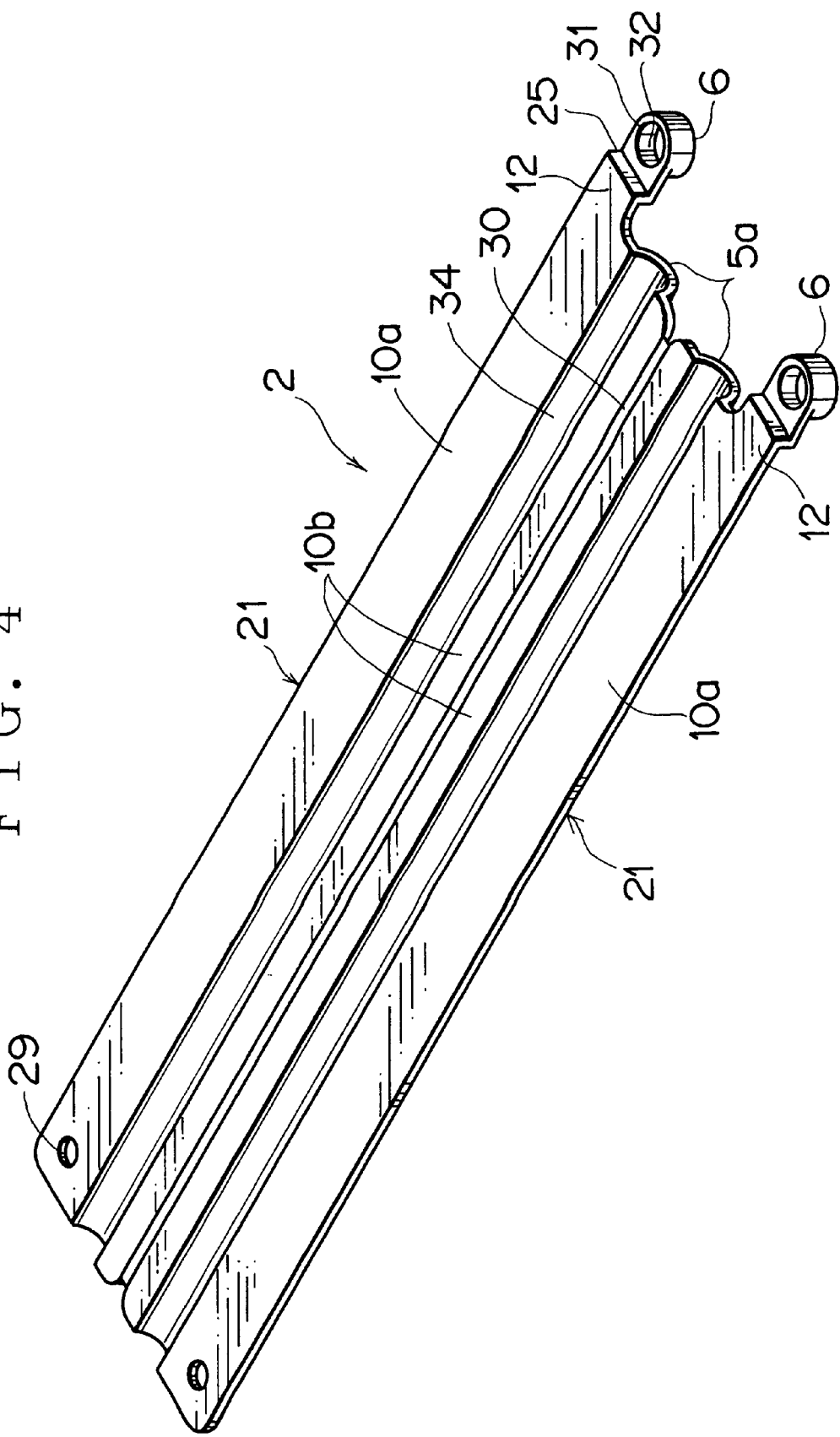
FIG. 4 is a perspective view showing the other of the link arms in an opened state of divided link arms.

Referring to FIG. 4, the link arm 2 consists of a pair of symmetrical divided link arms 21, a thin hinge portion 30 turnably connecting the divided link arms 21, and the concavities 6 formed on the extending portions 12 of the respective divided link arms 21.

Each divided link arm 21 consists of a semicylindrical portion 5a, a wide flat plate portion 10a extending from one edge of the semicylindrical portion 5a, a narrow flat plate portion 10b extending from the other edge of the semicylindrical portion 5a, and the extending portion 12 projecting from one side of the wide flat plate portion 10a.

The semicylindrical portion 5a, of course, has a semicircular groove 34 in the inside. One side of the flat plate portion 10b continues to the hinge portion 30. Through hole (i.e. fixing portions) 29 to mount the link arm 2 to a vehicle door with a bolt 8 (FIG. 1) is provided on the other end of each flat plate portion 10a. The backs of the concavities 6 project in the same direction as the semicylindrical portions 5a. Each concavity 6 has an opening 31 and a circular hollow 32 inside the opening 31 on a side of the groove 34.

The semicylindrical portions 4a,5a have the same inside diameter. And, a pitch of the concavities 6 is the same as of the convexities 7. A pitch of the through holes 28 is the same as of the through holes 29, and width of the flat plate portions 9,10 is equal. Length of the link arms 1,2 is not necessarily equal.

Figure 5:
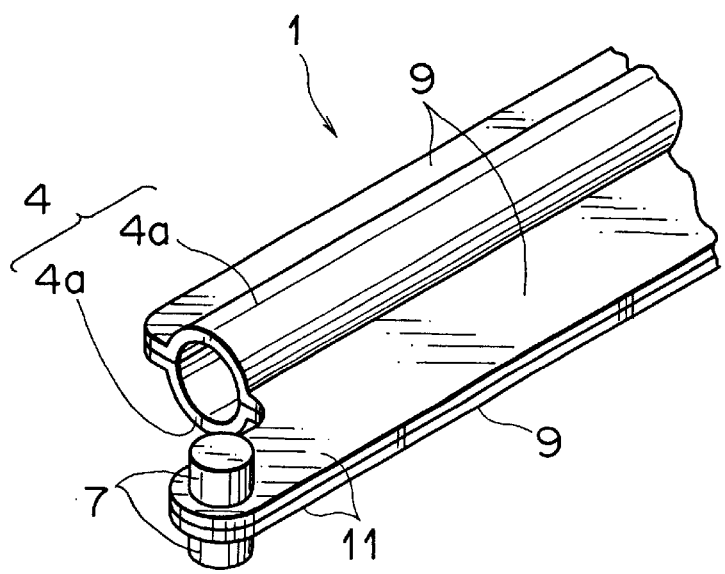
FIG. 5 is a perspective view showing a key portion of the link arm of FIG. 3 in a closed state of the divided link arms.

Referring to FIG. 5, the link arm 1 is formed by putting a pair of divided link arms 20 (FIG. 3) together, and, referring to FIG. 6, the link arm 2 is formed by putting a pair of divided link arms 21 (FIG. 4) together.

As is shown in FIG. 5, a pair of semicylindrical portions 4a makes the tubular portion 4. A pair of flat plate portions 9 are also put together, while increasing its rigidity. And, the convexities 7 are arranged in symmetry on the extending portions 11.

As is shown in FIG. 6, a pair of semicylindrical portions 5a makes the tubular portion 5. A pair of flat plate portions 10 are also put together, while increasing its rigidity. And, the concavities 7 are arranged in symmetry on the extending portions 12 with the space 26.

The wiring harness 3 (FIG. 1) is arranged inside the tubular portions 4,5 before a pair of semicylindrical portions 4a and a pair of semicylindrical portions 5a, respectively, are put together, which makes arrangement work of the wiring harness 3 and assembling work of the link arms 1,2 easier.

Especially, since the convexities 7 and the concavities 6 are integrally formed with the link arms 1,2, connecting work of the link arms is very easy. The above structure is useful and effective in a assembling method of the link arms.

Figure 8:
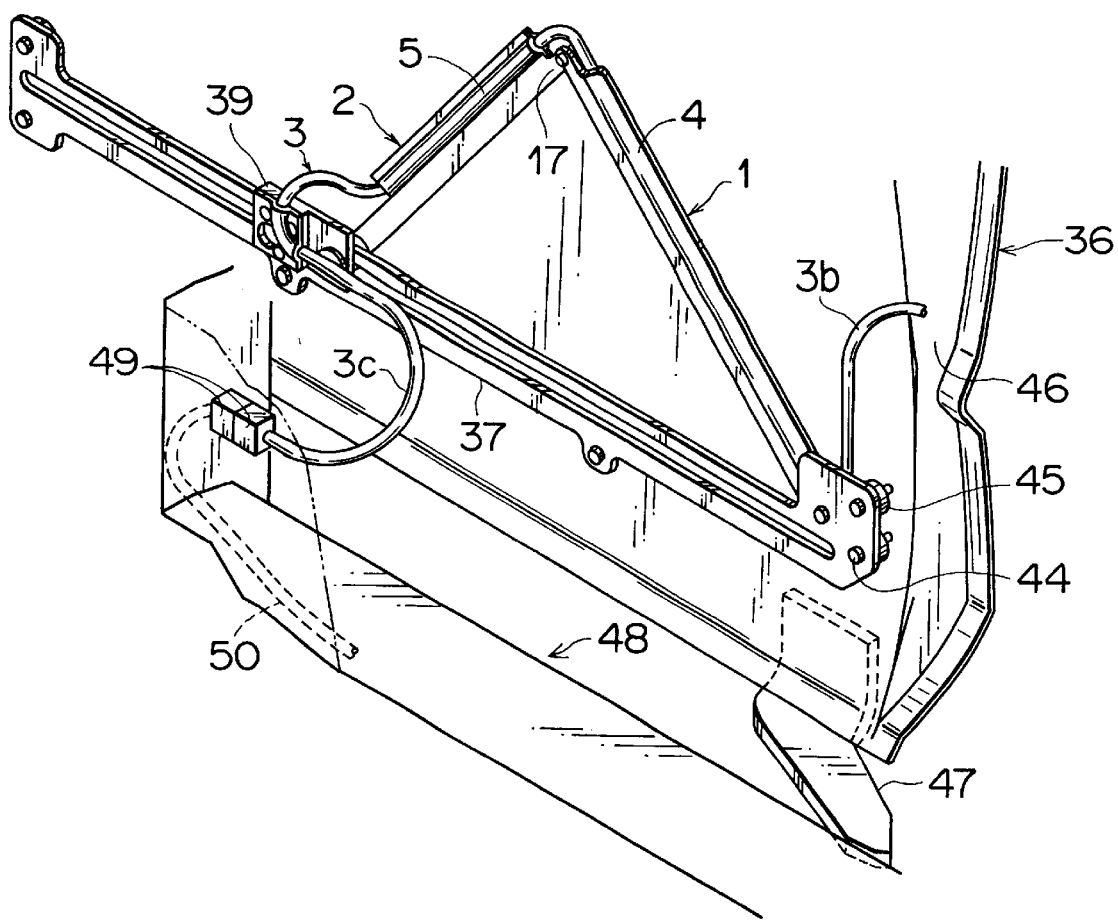
FIG. 8 is a perspective view showing a further applied embodiment of the embodiment of FIG. 7, wherein the present wiring harness bending mechanism is applied to a sliding door of motor vehicle.
Figures 9, 10:
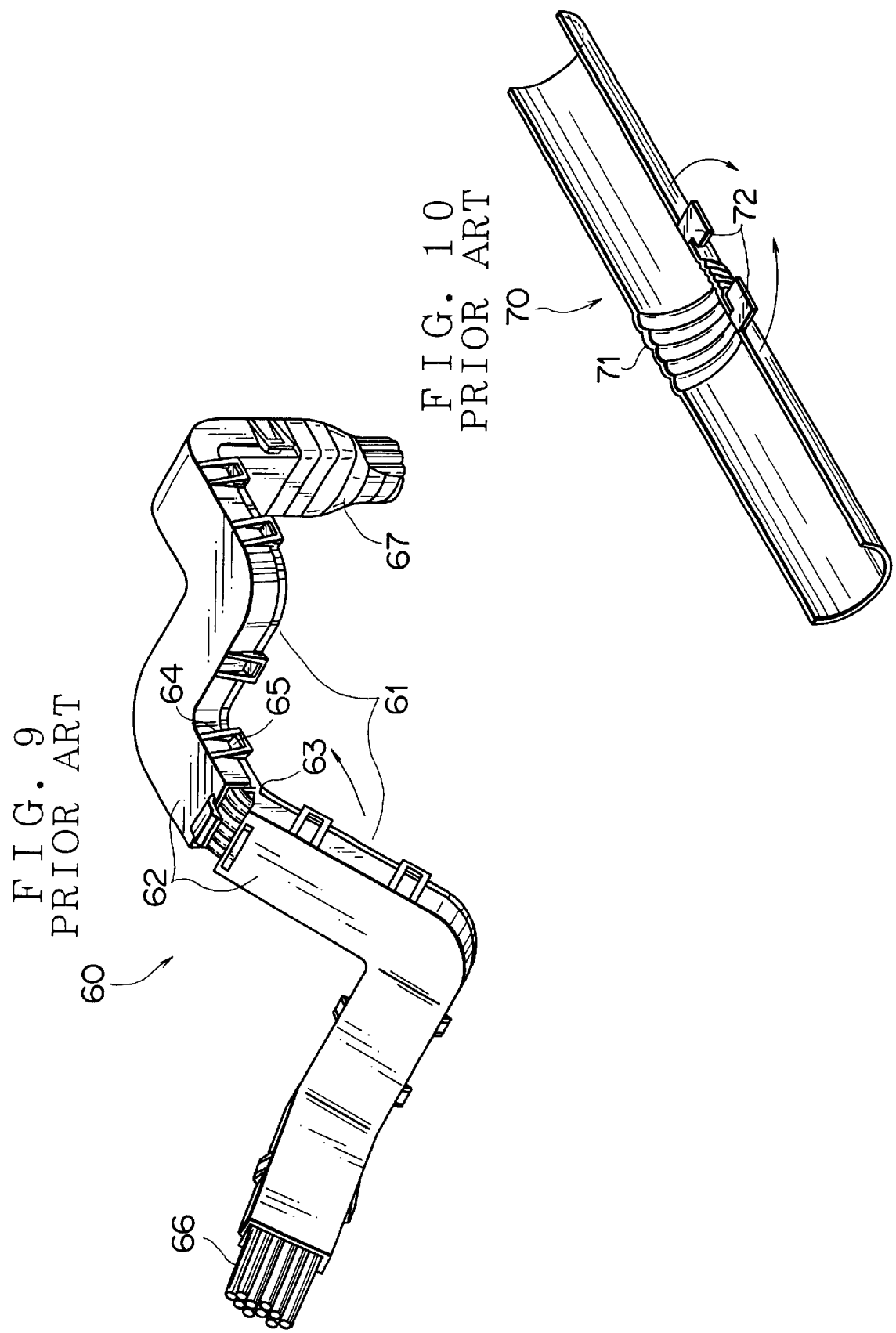
FIG. 9 is a perspective view showing a first prior art.
FIG. 10 is a perspective view showing a second prior art.

In this embodiment, the flat plate portions 9a,10a each can be put together with the respective bolts 8 and nuts (not shown) simultaneously with the assembly of the respective link arms 1,2 to the sliding door 36 (FIG. 8). Otherwise, the flat plate portions 9a,10a each may be put together with a welding means (not shown) or with an adhesive material (not shown). Or, they may be put together with a non-shown engaging means such as a clips or an engaging claw/hole.

Figure 7:
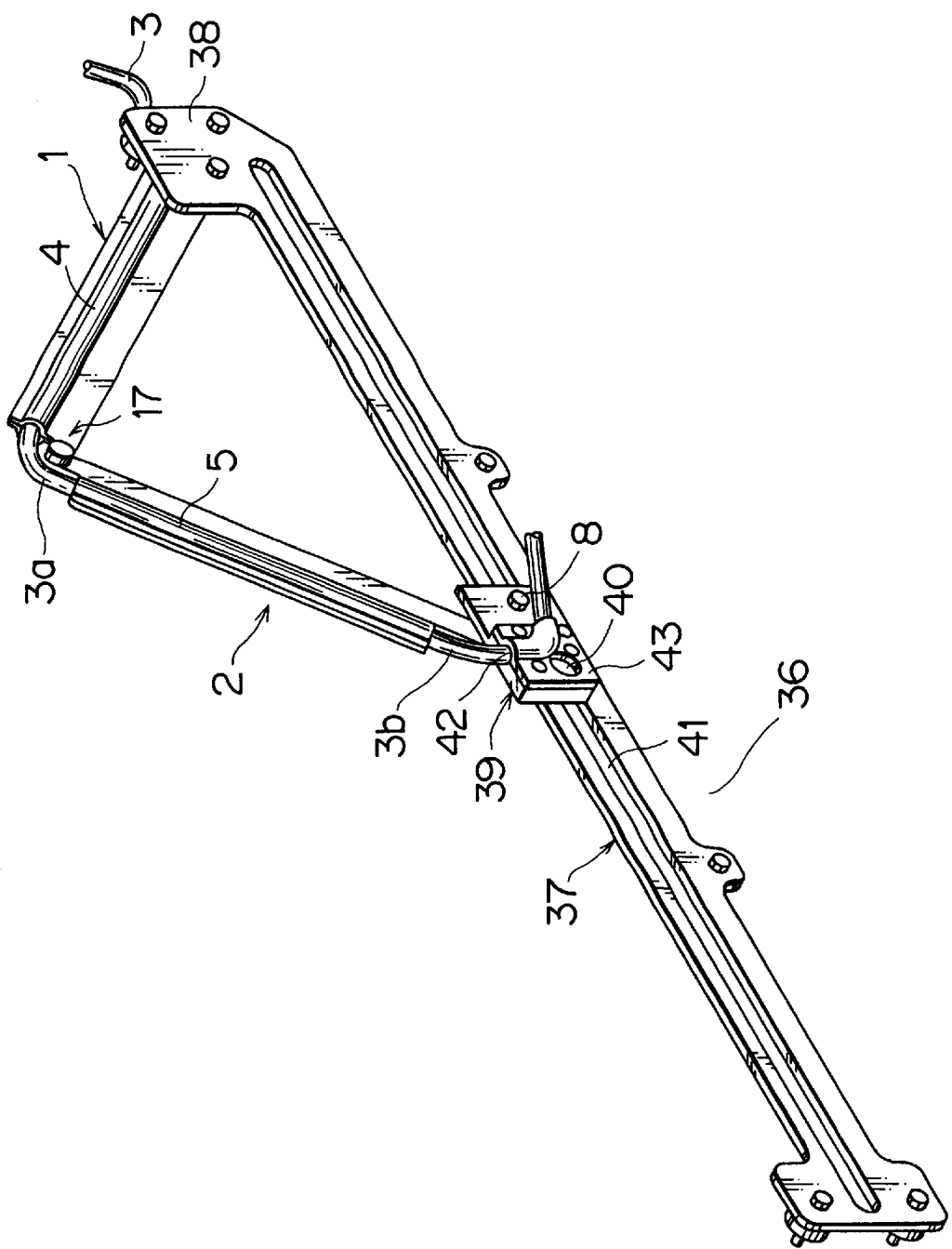
FIG. 7 is a perspective view showing an applied embodiment of the present wiring harness bending mechanism.

Next, FIGS. 7 and 8 show an embodiment wherein the link arms 1,2 are applied to a wiring harness bending mechanism of a sliding door 36 of vehicle. The same reference characters are applied to the corresponding elements or members of the aforementioned embodiment though shape of link arms are a little different from the ones thereof.

As shown in FIG. 7, a guide rail 37 is provided on the sliding door 36 in a horizontal direction. Here, the front of a vehicle is defined as "front". A front end portion of the link arm 1 is pivotably supported by a fixing plate 38 provided on a front end of the guide rail 37. And, a rear end portion of the link arm 2 slidably engages the guide rail 37 through a slide block 39. That is, the rear end portion of the link arm 2 is pivotably supported with the bolt 8 on the slide block 39. And, a supporting axis 40 provided at a rear side of the slide block 39 slidably engages a slot 41 on the guide rail 37.

The wiring harness 3 is accommodated inside the tubular portions 4,5 of the link arms 1,2 and is securely protected from the outside. And, the wiring harness 3 is exposed and curved (3a) at the link portion 17 of the link arms 1,2. And, a harness receiving groove 42 is formed on the slide block 39, and the wiring harness 3 is secured by a cover portion 43. Another exposed portion 3b of the wiring harness 3 is set between the tubular portion 5 of the link arm 2 and the slide block 39. This prevents an excessive force on the wiring harness (3b) when the link arms 1,2 move.

As shown in FIG. 8, the guide rail 37 is fixed to the back of a metal panel 46 of the sliding door 36 by a bolt 44 and a spacer 45. The sliding door 36 engages a portion of a vehicle body 48 through a guide arm 47. The wiring harness 3 led out from the slide block 39 is connected to a wiring harness 50 of the vehicle body 48 side (a power source side) with a connector 49 through curved portion 3c. The wiring harness (3b) led out from the link arm 1 is connected to non-shown various electric appliances or accessories in the sliding door 36.

When the sliding door 36 is opened, the slide block 39 almost stays still due to the curved portion 3c. Specifically, the guide rail 37 and the link arm 1 go back along with the sliding door 36, and a pair of link arms 1,2 stand up gradually while the wiring harness 3 is gradually bent around the link portion 17.

On the contrary, when the sliding door 36 is closed, the guide rail 37 goes forward while the slide block 39 almost stays still. And, a pair of link arms 1,2 gradually open while the wiring harness 3 gradually becomes straight. The slide block 39 goes back relative to the guide rail 37. This mechanism enables continuous power feeding to the sliding door 36 from the body side through the wiring harness 3.

Since the wiring harness 3 is protected by the tubular portions 4,5 of the link arms 1,2, the wiring harness 3 does not wear off and is not damaged.

Though a pair of link arms 1,2 is provided in the above-described embodiment, a plurality, for example four, of link arms (not shown) may be applied zigzag to the bending mechanism. In this case, the intermediate link arms each have the concavity 6 or the convexity 7 on each end thereof in an engageable arrangement.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wiring harness bending mechanism, comprising:
   a wiring harness; and
   first and second elongated link arms each having an elongated tubular portion to put the wiring harness therethrough,
   wherein a pair of convexities are formed at an end portion other than the elongated tubular portion of the first elongated link arm and a pair of concavities to engage the convexities are formed at an end portion other than the elongated tubular portion of the second elongated link arm.

2. The wiring harness bending mechanism as set forth in claim 1, wherein the first elongated link arm is formed of a pair of first divided elongated link arms connected with a hinge portion and each divided elongated link arm having a convexity, and the second elongated link arm is formed of a pair of elongated second divided link arms connected with a hinge portion and each divided elongated link arm having a concavity.

3. The wiring harness bending mechanism as set forth in claim 1, wherein
   a plate portion is provided projectingly from each of the elongated tubular portions along substantially an entire length of each elongated link arm, and the pair of convexities are arranged on one end of one plate portion and the pair of concavities are arranged on one end of the other plate portion.

4. The wiring harness bending mechanism as set forth in claim 3, wherein
   a fixing portion is provided on each of the other ends of the respective plate portions for mounting the first and second elongated link arms.

5. The wiring harness bending mechanism as set forth in claim 3, wherein
   the wiring harness is bendably exposed between the elongated tubular portions.

6. The wiring harness bending mechanism as set forth in claim 1, wherein
   the first elongated link arm is pivotably supported by a guide rail and the second elongated link arm slidably engages the guide rail.

7. The wiring harness bending mechanism as set forth in claim 1, further comprising one or more elongated link arms provided intermediate of the first and second elongated link arms and each intermediate elongated link arm has a pair of convexities or a pair of concavities at each end thereof.

* * * * *